US012137259B2

(12) United States Patent
Somlai-Fischer et al.

(10) Patent No.: US 12,137,259 B2
(45) Date of Patent: *Nov. 5, 2024

(54) REAL-TIME VIDEO FEED PRESENTATION ENHANCEMENT SYSTEM

(71) Applicant: Prezi, Inc., San Francisco, CA (US)

(72) Inventors: Adam Somlai-Fischer, Budapest (HU); Zsuzsa Weiner, Budapest (HU); Dániel Varga, Budapest (HU)

(73) Assignee: Prezi, Inc., Concord, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,862

(22) Filed: May 16, 2023

(65) Prior Publication Data
US 2023/0421820 A1   Dec. 28, 2023

Related U.S. Application Data

(63) Continuation of application No. 17/501,549, filed on Oct. 14, 2021, now Pat. No. 11,695,971.
(Continued)

(51) Int. Cl.
H04N 21/2187 (2011.01)
G06T 7/246 (2017.01)
(Continued)

(52) U.S. Cl.
CPC ......... H04N 21/2187 (2013.01); G06T 7/248 (2017.01); G06T 7/70 (2017.01);
(Continued)

(58) Field of Classification Search
CPC ........... H04N 21/23418; H04N 21/274; H04N 21/4722; H04N 21/2187; H04N 7/147;
(Continued)

(56) References Cited

U.S. PATENT DOCUMENTS 11,023,035 B1 * 6/2021 Atlas ................... G06F 3/014
11,112,875 B1   9/2021 Zhou et al.
(Continued)

OTHER PUBLICATIONS

"U.S. Appl. No. 17/501,549, Non Final Office Action mailed Sep. 23, 2022", 15 pgs.
(Continued)

Primary Examiner — Michael R Telan
(74) Attorney, Agent, or Firm — Schwegman, Lundberg & Woessner, P.A.

(57) ABSTRACT

A system is configured to enhance a video feed in real time. A live video feed captured by a video capturing device is received. A presentation of the live video feed on one or more client devices is enhanced. The enhancing includes causing a first content item of a plurality of content items to be displayed at a first location within the presentation of the five video feed. Based on a detecting of a first instance of a first gesture made by a hand at the first location in the live video feed, a content item manipulation mode with respect to the first content item is entered. The entering of the content item manipulation mode with respect to the first content includes at least one of causing the first content item to be moved within the presentation of the live video feed based on a movement of the hand or causing a scale of the first content item to be changed within the presentation of the live video feed based on a detecting of a second gesture made by the hand.

20 Claims, 20 Drawing Sheets
(16 of 20 Drawing Sheet(s) Filed in Color)

Related U.S. Application Data

(60) Provisional application No. 63/092,265, filed on Oct. 15, 2020.

(51) Int. Cl.
*G06T 7/70* (2017.01)
*G06V 40/20* (2022.01)
*H04N 21/234* (2011.01)
*H04N 21/274* (2011.01)
*H04N 21/4722* (2011.01)

(52) U.S. Cl.
CPC ....... *G06V 40/28* (2022.01); *H04N 21/23418* (2013.01); *H04N 21/274* (2013.01); *H04N 21/4722* (2013.01)

(58) Field of Classification Search
CPC .......... G06F 3/011; G06F 3/017; G06F 3/005; G06F 3/014; G06T 7/248; G06T 7/70
See application file for complete search history.

(56) References Cited

U.S. PATENT DOCUMENTS

| | | | |
|---|---|---|---|
| 11,695,971 | B2 | 7/2023 | Somlai-Fischer et al. |
| 2015/0355715 | A1* | 12/2015 | Smith .............. H04N 21/42222 715/863 |
| 2021/0191600 | A1* | 6/2021 | Lemay ................ G06F 3/04842 |
| 2021/0192221 | A1 | 6/2021 | Iyer et al. |
| 2021/0352348 | A1 | 11/2021 | Reid et al. |
| 2022/0124382 | A1 | 4/2022 | Somlai-fischer et al. |

OTHER PUBLICATIONS

"U.S. Appl. No. 17/501,549, Response filed Dec. 22, 2022 to Non Final Office Action mailed Sep. 23, 2022", 10 pgs.
"U.S. Appl. No. 17/501,549, Notice of Allowance mailed Feb. 22, 2023", 5 pgs.
"U.S. Appl. No. 17/501,549, Corrected Notice of Allowability mailed Mar. 2, 2023", 2 pgs.

* cited by examiner

REAL-TIME VIDEO FEED PRESENTATION ENHANCEMENT SYSTEM

CROSS-REFERENCE TO RELATED APPLICATIONS

This application is a continuation of U.S. patent application Ser. No. 17/501,549, filed Oct. 14, 2021, which claims the benefit of U.S. Provisional Application No. 63/092,265, filed Oct. 15, 2020, which are incorporated by reference herein in their entirety.

TECHNICAL FIELD

The subject matter disclosed herein generally relates to the technical field of special-purpose machines for processing of digital media, including software-configured computerized variants of such special-purpose machines and improvements to such variants, and to the technologies by which such special-purpose machines become improved compared to other special-purpose machines that process digital media.

BACKGROUND

As workforces become increasingly connected and collaborative, the demand for virtual meetings has risen. Participants can attend virtual meetings from remote offices or from anywhere where they have Internet connections. However, today's web-conferencing solutions have various limitations. For example, it can be difficult to make effective use of traditional presentation tools, such as a projector or a white board, when making a web-based presentation.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Some embodiments are illustrated by way of example and not limitation in the figures of the accompanying drawings.

DETAILED DESCRIPTION

Figure 1:
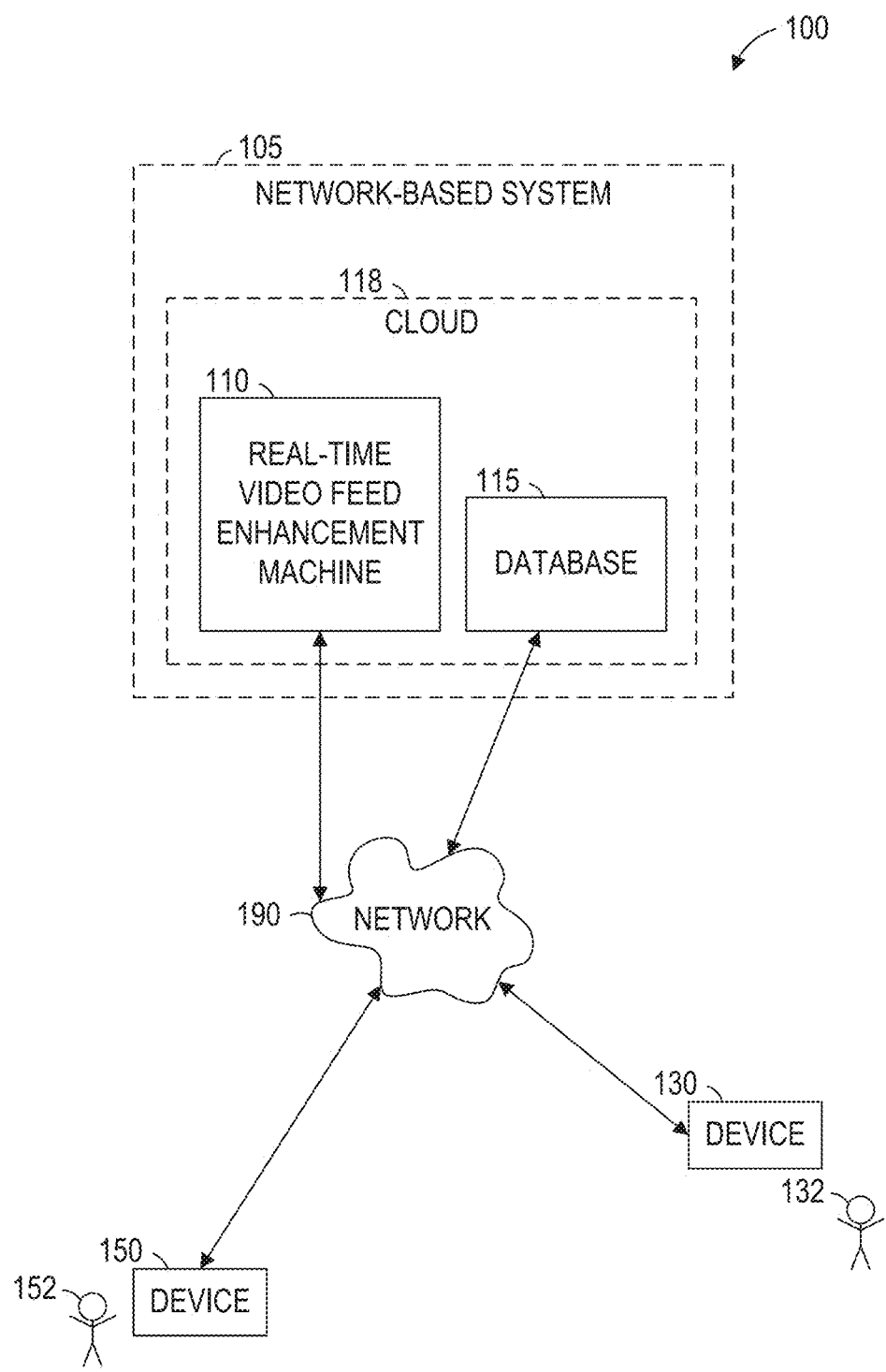
FIG. 1 is a network diagram illustrating a network environment suitable for provision of digital media or other processing of digital media, according to some example embodiments.

Example methods (e.g., algorithms) facilitate provision or other processing of digital media (e.g., video, audio, images, text, or any suitable combination thereof), and example systems (e.g., special-purpose machines configured by special-purpose software) are configured to facilitate provision or other processing of digital media. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A digital media system is configured to support any one or more of multiple features with respect to enhancing video feeds captured by a video capture device for presentation on one or more client devices. Examples of such features include detecting gestures within the video feed that represent an action that is to be taken to enhance a presentation of the video feed, such as causing a content item to be incorporated into the presentation of the video feed, manipulating a content item that has been incorporated into the presentation of the video feed, and removing a content item that has been incorporated into the presentation of the video feed. Examples of content items include two- or three-dimensional content items that are stored in a database for incorporating into the presentation of the video feed.

Thus, for example, a user making a web presentation could use a gesture to cause a content item related to the web presentation to appear in real-time in a live video feed of the user that is being presented on one or more client devices of one or more users. Additionally, the user could use one or more additional gestures to manipulate (e.g., reposition or resize) a content item that has been incorporated into the presentation of the video feed or to cause the content item to be removed from the presentation video feed.

In example embodiments, a user associated with a live video feed may initiate a survey. In example embodiments, based on the initiation of the survey a plurality of answers to a survey question associated with the survey are aggregated. The aggregating may include, based on a further gesture being detected in real time in one of one or more other video feeds captured via one or more other video capture devices, increasing a count of a first possible answer the survey question or, based on a different gesture being detected in real time in the one of one or more other video feeds captured via one or more other video capture devices, increasing a count of a second possible answer the survey question. In example embodiments, a content item of the plurality of content items is updated in real time at a location within the presentation of the live video feed. The content item includes a visual representation of the aggregating of the plurality of answers during a collecting of the plurality of answers.

In example embodiments, a real-time video enhancement machine analyzes a plurality of video feeds in real-time, such as a plurality of video feeds associated with participants of a video conference or other communication session and responds in real-time to events detected within the plurality of video feeds. Here, real-time is meant to include a response within milliseconds or microseconds, such as a response that is guaranteed by the real-time video enhancement machine within a specified deadline relative to an event. Thus, for example, the real-time video enhancement machine returns results without significant delay and sufficiently quickly to affect the environment at that time. In example embodiments, the real-time video enhancement machine is implemented as one or more software services, which may be hosted on a software-as-a-service (SaaS) layer or platform. The SaaS platform may be part of a service-oriented architecture, being stacked upon a platform-as-a-service (PaaS) layer which, may be, in turn, stacked upon a infrastructure-as-a-service (IaaS) layer (e.g., in accordance with standards defined by the National Institute of Standards and Technology (NIST)).

FIG. 1 is a network diagram illustrating a network environment 100 suitable for provision of the processing digital media, according to some example embodiments. The network environment 100 includes a real-time video feed enhancement machine 110, a database 115, and devices 130 and 150, all communicatively coupled to each other via a network 190. The real-time video feed enhancement machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The real-time video feed enhancement machine 110, the database 115, and the devices 130 and 150 may each be implemented in one or more special-purpose (e.g., specialized) computer systems, in whole or in part, as described below with respect to FIG. 10.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130 (e.g., a client device configured to present digital media, including enhanced video content). For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150 (e.g., a client device configured to present digital media, including enhanced video content). As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The real-time video feed enhancement machine 110 provides data streaming services and manages enhancing of live video feeds in real-time (e.g., during a web conference call). The real-time video feed enhancement machine 110 may find useful applications in entertainment (e.g., sports, concerts, or documentaries), education (e.g., academic, corporate, or professional training), industry (e.g., tourism or medicine), or any suitable combination thereof, including live or otherwise low-latency applications (e.g., news reporting or gaming). The real-time video teed enhancement machine 110 may accordingly provide one or more video feeds that have been enhanced with content items that may be manipulated in real-time during the presentation of the video feeds on one or more client devices. The enhanced content may be provided to one or more client devices, such as one or more of the devices 130 and 150 (e.g., a virtual-reality headset, a mobile device, or other device capable of displaying the enhanced video feeds). As an example, during a presentation of plurality of video feeds on a client device that correspond to participants of a video conference call or other communications session, one or more of the plurality of video feeds may be enhanced to include one or more content items based on detections of gestures by the participants in the one or more of the plurality of video feeds.

Figure 2:
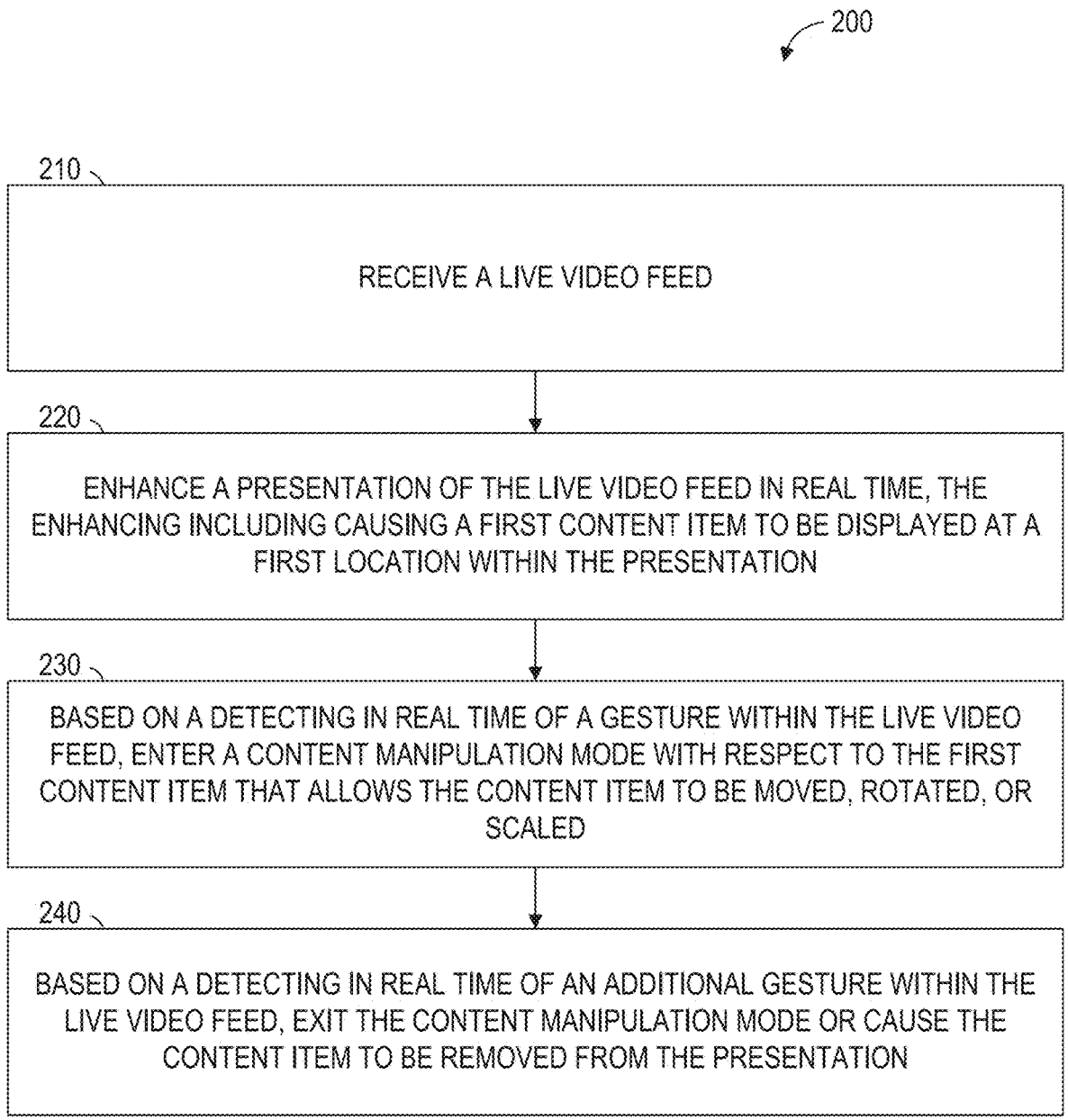
FIG. 2 depicts a flowchart of an example method for enhancing a video feed in real time.

In some example embodiments, the real-time video feed enhancement machine 110 or some other machine within the network-based system 105 is configured to enhance a video feed in real-time. One example method 200 for enhancing a video feed in real time is illustrated in FIG. 2.

At operation 210, a live video feed is received. In example embodiments, the live video feed is captured by a video capturing device associated with a client device and transmitted in real time to the network-based system 105.

At operation 220, a presentation of the live video feed is enhanced in real time. For example, a content item of a plurality of content items stored in the databased is inserted into the video feed (e.g. displayed in the foreground of the video feed). In example embodiments, the content item is a two-dimensional representation (e.g., an image) of a two-dimensional or three-dimensional object. In example embodiments, the content item relates to a topic of a presentation being made by a user associated with the video feed. In example embodiments, the plurality of objects may be arranged in a sequence based on the topic. Additionally, the objects may be assigned a default location on the screen and a default size. Thus, an initiation of the presentation by the user may cause the first item in the sequence to be incorporated into the video feed at its the default location and at its default size. Alternatively, the content item may be incorporated into the presentation based on a detection of a first gesture that was previously associated with an action to add the content item to the video feed. In example embodiments, the first gesture may be the opening of a closed fist into an open hand. In this case, the content item may be caused to appear in the video feed at the location within the video feed where the gesture was made instead of at its default location. In example embodiments, the size of the content item may also be scaled up or down from its default size based on the size of the open hand. In example embodiments, if the content item is added based on a detection of the first gesture, the content item is automatically placed into a content manipulation mode. In example embodiments, the gestures are detected by measuring a ratio of a vertical distance between a palm of the hand and a middle finger of the hand and measuring a distance between a pinky of the hand and a thumb of the hand in real time during the presentation of the live video. In other example embodiments, the gestures are detected by applying a machine-learned model that was previously trained to recognized patterns in the video feed corresponding to the gestures.

At operation 230, if the content object is not already in the content manipulation mode, it is placed into the content manipulation mode based on a detection of a second gesture. In example embodiments, the second gesture may be a holding of an open hand at the location of the object within the video teed. In example embodiments, when the content item is in content manipulation mode, a subsequent movement of the hand causes the content object within the video feed to move (e.g., such that it sticks to or tracks the movement of the hand). A subsequent rotation of the hand clockwise or counterclockwise causes the size of the content item to be scaled up or down. For a content item that is a representation of a three-dimensional object, rotations and movements of the hand may be tracked in three dimensions, triggering corresponding three-dimensional rotations, movements, or scaling of the content item within the video feed.

At operation 240, based on a detection of a third gesture, the content manipulation mode may end with respect to the first content item, causing the first content item to be pinned or remain at its current location within the video feed regardless of subsequent gestures detected within the video frame (unless and until the first gesture is detected again with respect to the first content item, thus placing the content item back into the content manipulation mode). In example embodiments, the third gesture may be an at least partial closing of an open hand, such as a closing of a thumb on an otherwise open hand. Or, based on a detection of a fourth gesture, the first content item may be removed from the presentation of the video feed. In example embodiments, the fourth gesture may be at least a partial closing of the open hand combined with a holding of the gesture for a predetermined period of time at the location of the content object. In example embodiments, a removing of the content item may result in a repeating of operations 210-240 with respect to a next item in the plurality of content items that has been selected for presentation in the video feed. Thus, for example, either the next content item in the plurality of content items will appear automatically at a default location and size in the video feed or the next item may appear when another instance of the first gesture is detected within the video feed, depending on how presentation options associated with the plurality of content items have been configured (e.g., via a separate presentation configuration user interface accessible to the presenter).

Figure 3:
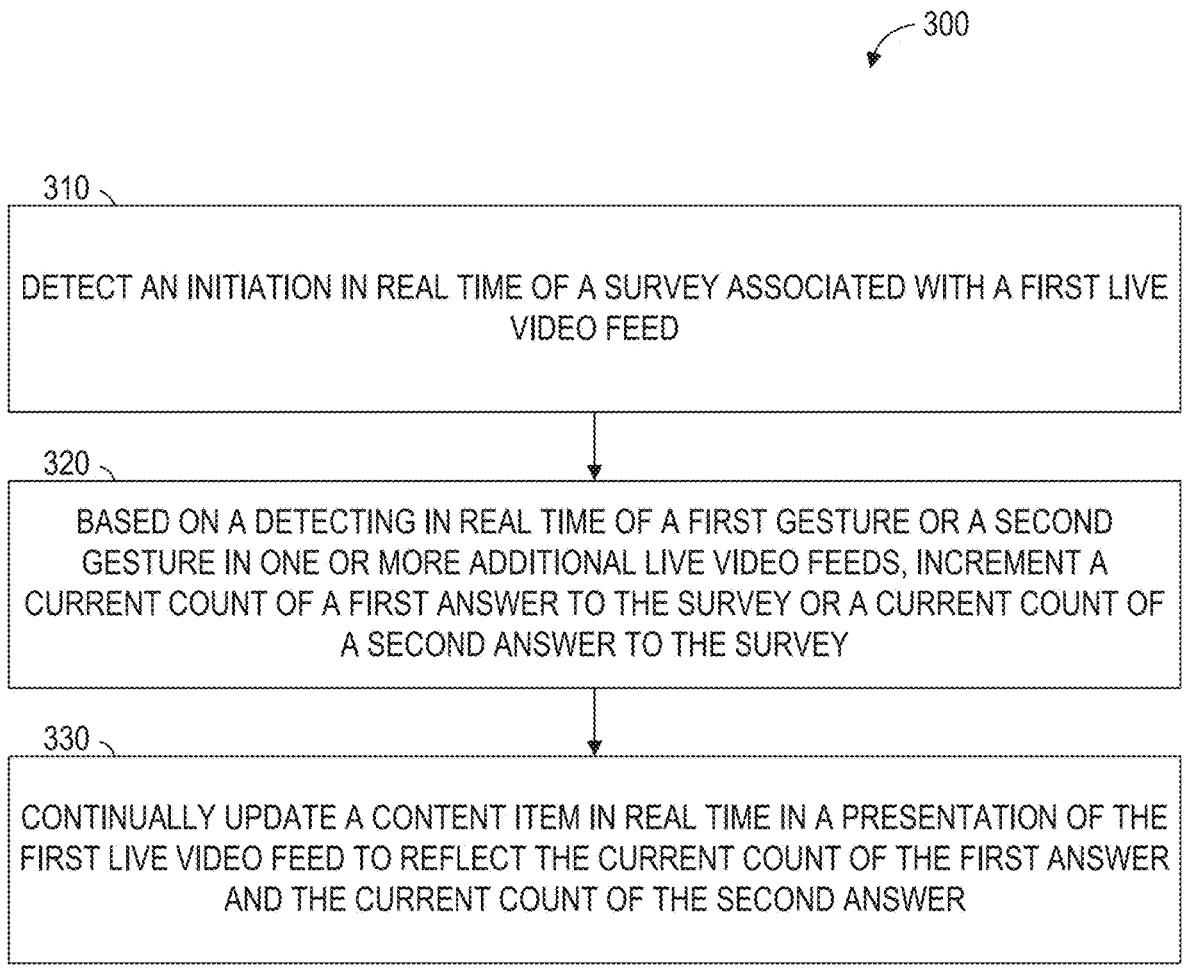
FIG. 3 depicts a flowchart of an example method for enhancing a plurality of video feeds in real time to perform a survey.

In some example embodiments, the real-time video feed enhancement machine 110 or some other machine within the network-based system 105 is configured to provide enhancements to a plurality of video feeds in real-time to perform a survey. One example method 300 for enhancing a plurality of video feeds in real time to perform a survey is illustrated in FIG. 3.

At operation 310, an initiation of a survey by one of a plurality of client devices is detected. For example, it is determined that a presenter has caused a content item to appear within a video feed of the presented, wherein the appearance of the content item triggers the initiation of the survey. Or it is determined that the presenter has made a gesture that is associated with the initiation of a survey. In example embodiments, the initiation of the survey includes prompting the other users associated with other live video feeds to answer a survey question by performing one or more gestures. In example embodiments, the initiation of the survey may be performed by other users besides the current presenter.

At operation 320, based on a detecting in real time of a first gesture or a second gesture in each of the live video feeds. Based on a detecting of the first gesture, a current count of a first answer to the survey question is incremented or based on a detecting of the second gesture, a current count of a second answer to the survey question is incremented. In example embodiments, the initiator's live video feed is ignored for purposed of incrementing the counts.

At operation 330, a content item representing the survey results is inserted into the video feed of the initiator of the survey to reflect the current count of the first answer and the current count of the second answer. The content item continually updated in real time as each answer is detected in each of the other video feeds. In example embodiments, the survey is closed after a predetermined time period has elapsed or the initiator takes an action to close the survey. In example embodiments, the closing of the survey may be based on a detecting of a gesture by the initiator that is associated with the closing of the survey.

Figure 4A:
FIG. 4A depicts a video feed that is being displayed on one or more client devices in which a user is making a first part of a gesture that, when detected by a real-time video enhancement machine, will cause a content item from the presentation to appear within the video feed at the location of the gesture.

FIG. 4A depicts a video feed that is being displayed on one or more client devices. In example embodiments, the video feed is associated with a presentation that is being made by a presenter associated with the video feed. In example embodiments, the presenter initiated a presentation that is associated with a plurality of content items. In example embodiments, upon the initiating of the presentation, metadata pertaining to the presentation is inserted into the video feed. For example, a progress bar is added to the bottom of the video feed. In example embodiments, the progress bar may include various metadata items, such as a topic (e.g., "Habitat") of the presentation and a current a progress of the presentation. As shown in FIG. 4A, the presenter is making a first part of a gesture that, when detected by a real-time video enhancement machine, will cause a content item from the presentation to appear within the video feed at the location of the gesture. In this case, the first part of the gesture is a closed fist.

Figure 4B:
FIG. 4B depicts the video feed of FIG. 4A at a later point in time when the user has completed a second part of the gesture to cause the content item to appear.

FIG. 4B depicts the video feed of FIG. 4A at a later point in time. Now the presenter has completed a second part of the gesture to cause the content item to appear (e.g., by opening his hand). In response, based on a detection of the completed gesture by the real-time video machine, a content item from the plurality of content items associated with the presentation is inserted into the video feed. In example embodiments, the content item is selected from the plurality of content items (e.g., based on a sequence associated with the plurality of content items). In example embodiments, the content item is scaled to a size that fits within the open hand. In this example, the content item is an image of a bunny. In example embodiments, a cursor is shown on the screen. In example embodiments, the cursor is indicative of a content manipulation mode being active with respect to the content item. Thus, for example, when the presenter moves his hand, the content item may track the movement of the hand. Or, for example, when the presenter turns his hand right or left, a scale of the content item may be increased or decreased. In example embodiments, the cursor also represents information pertaining to an orientation of the hand, such as a visual representation of the base and/or a tip of the forefinger of the hand.

Figure 4C:
FIG. 4C depicts the video feed of FIG. 4B at a later point in time when the user has moved his hand toward the middle of the screen and turned his hand to the right, causing the content item to be moved and the size of the content item to increase.

FIG. 4C depicts the video feed of FIG. 4B at a later point in time. Here, the presenter has moved his hand toward the middle of the screen and turned his hand to the right, causing the content item to be moved and the size of the content item to increase.

Figure 4D:
FIG. 4D depicts the video feed of FIG. 4C at a later point in time when the presenter has made a gesture that has caused the content item to be removed from the video feed.

FIG. 4D depicts the video feed of FIG. 4C at a later point in time. Here, the presenter has made a gesture that has caused the content item to be removed from the video feed. In this example, the gesture is a partial closing of the hand (e.g., by closing the thumb of the hand).

Figure 5A:
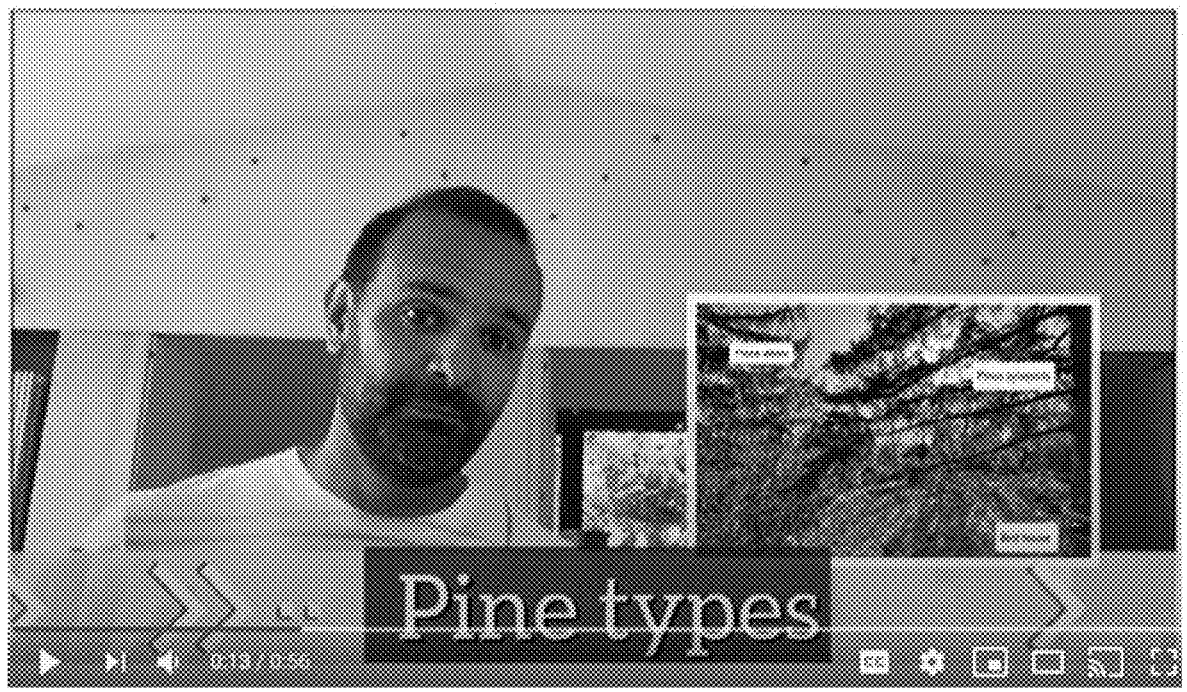
FIG. 5A depicts the video feed of FIG. 4D at a later point in time when a new content item is inserted automatically (e.g., without a gesture being made by the presenter) based on a configuration setting associated with the new content item in a configuration file associated with the presentation.

FIG. 5A depicts the video feed of FIG. 4D at a later point in time. Here, based on the removing of the previous content item, a new content item from the presentation is inserted into the video feed. In this case, the new content item is inserted automatically (e.g., without a gesture being made by the presenter) based on a configuration setting associated with the new content item in a configuration file associated with the presentation. In this example, the new content item uses a default location and a default size (e.g., as specified in a configuration file associated with the presentation). Additionally, as shown, metadata is updated in the video feed to, for example, indicate a new topic for the presentation (e.g., "Pine types").

Figure 5B:
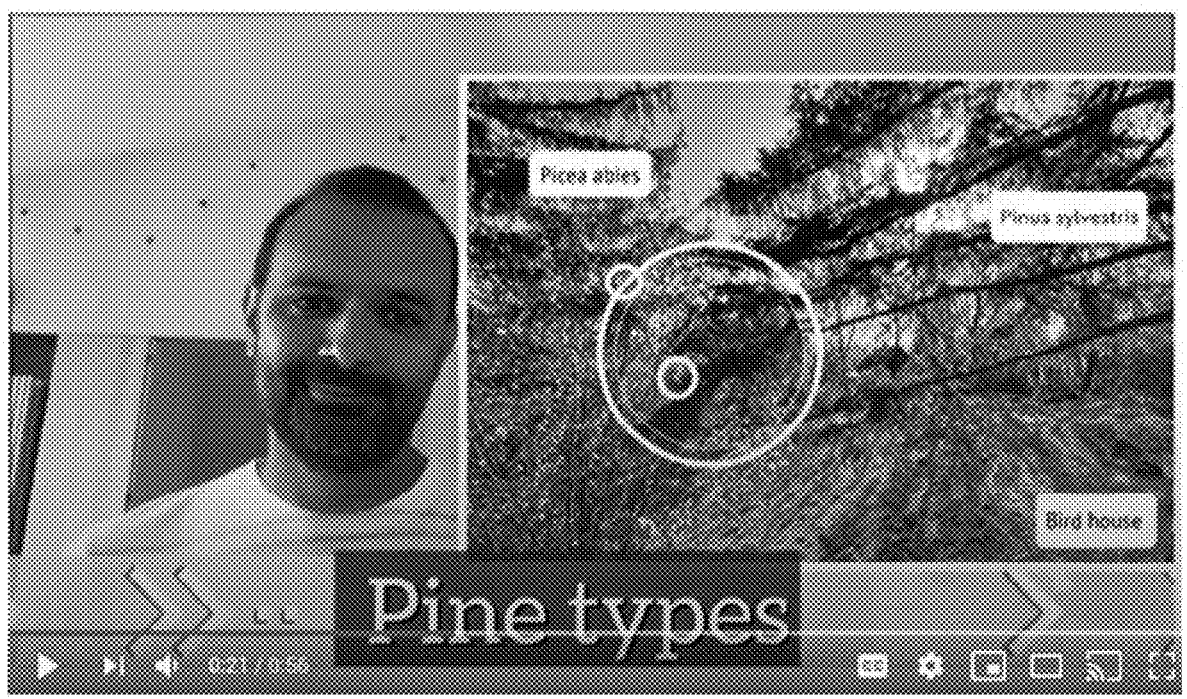
FIG. 5B depicts the video feed of FIG. 5A at a later point in time when it has been detected that the user has entered into a content manipulation mode with respect to the content item.

FIG. 5B depicts the video feed of FIG. 5A at a later point in time. Here, it has been detected that the presenter has entered into a content manipulation mode with respect to the content item. For example, it was detected that the presenter made a gesture with respect to the content item, such as holding an open hand at a position of the content item for a predetermined amount of time. Upon entering the content manipulation mode, the cursor is caused to be presented in the foreground of the video feed. However, the hand of the presenter is caused to be hidden behind the content item. As shown, the presenter has increased a size of the content item (e.g., by rotating his hand after entering the content manipulation mode with respect to the content item).

Figure 5C:
FIG. 5C depicts the video feed of FIG. SB at a later point in time when the user has pinned the content item at a desired location and size, exiting the content manipulation mode with respect to the content item.

FIG. 5C, depicts the video feed of FIG. 5B at a later point in time, Here, the presenter has pinned the content item at a desired location and size, exiting the content manipulation mode with respect to the content item. Thus, although the presenter may be moving his hand behind the content item, the content item remains at a fixed location.

Figure 5D:
FIG. 5D depicts the video feed of FIG. 5C at a later point in time when the user has entered a pointer mode.

FIG. 5D depicts the video feed of FIG. 5C at a later point in time. Here, the presenter has entered a pointer mode. In example embodiments, the presenter may enter the pointer mode by performing a gesture, such as by closing his hand into a fist and then extending the thumb and forefinger. While in the pointer mode, a skeleton-like cursor is inserted into the video feed that tracks the presenter's hand position, including the positions of the presenter's thumb and forefingers. In example embodiments, the cursor is at least partially transparent so that the cursor does not completely obscure the content item.

Figure 5E:
FIG. 5E depicts the video feed of FIG. 5D at a later point in time when the user has moved his hand (and thus the pointer cursor) to a different location.
Figure 5F:
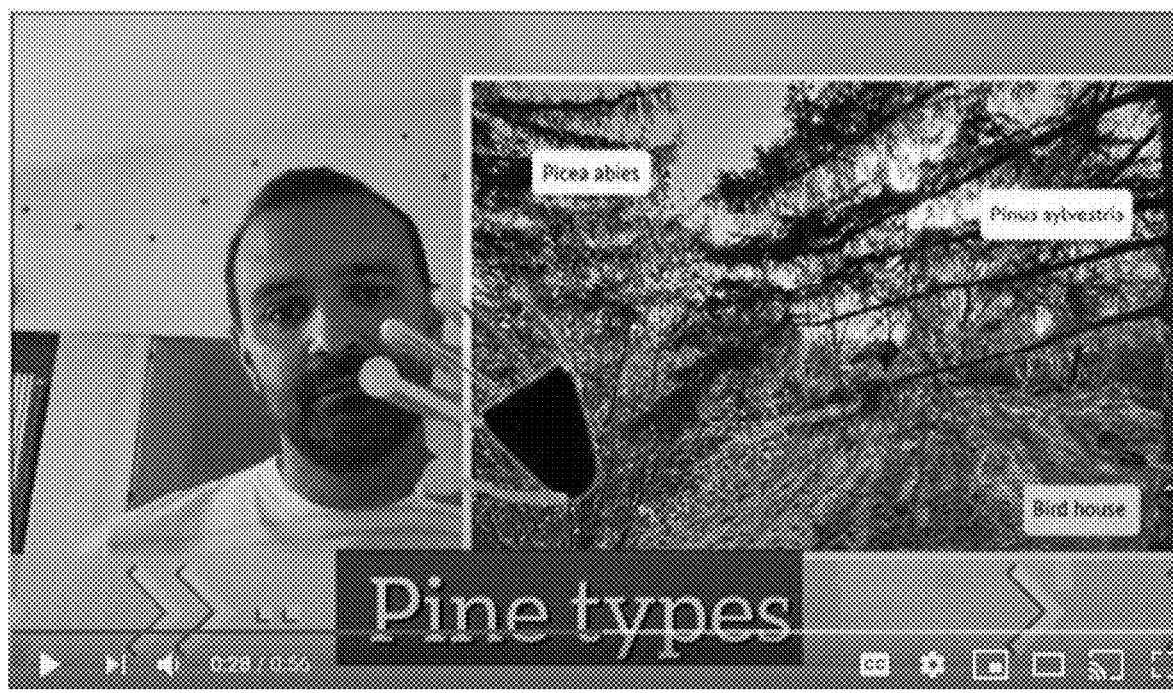
FIG. 5F depicts the video feed of FIG. 5E at a later point in time when the user has moved pail of his hand out from behind the content item.

FIG. 5E depicts the video feed of FIG. 5D at a later point in time. Here, the presenter has moved his hand (and thus the pointer cursor) to a different location (e.g., to bring attention to a particular pine type during the presentation), FIG. 5F depicts the video feed of FIG. 5E at a later point in time. Here, the presenter has moved part of his hand out from behind the content item. As shown, the skeleton cursor matches the hand, but the hand itself is only visible when it is not behind the content item.

Figure 6A:
FIG. 6A depicts the video feed of FIG. 5F at a later point in time when the user has caused the presentation to advance by, for example, making a gesture associated with advancing the presentation.

FIG. 6A depicts the video feed of FIG. 5F at a later point in time. Here, the presenter has caused the presentation to advance by, for example, making a gesture associated with advancing the presentation. As shown, a visual transition is used to show the advancement of the presentation. For example, the previous content item is moved to the side and eventually off the screen. Then a new content item slides into the video feed. Here, the new content item is a map of the United States on which different locations are depicted with color-coded symbols. Upon the advancement of the presentation, the metadata is updated (e.g., to show the new topic is now "Locations").

Figure 6B:
FIG. 6B depicts the video feed of FIG. 6A at a later point in time w the user has switched into content manipulation mode with respect to the new content item to reposition and resize the content item within the view feed.

FIG. 6B depicts the video feed of FIG. 6A at a later point in time. Here, the presenter has switched into content manipulation mode with respect to the new content item to reposition and resize the content item within the view feed.

Figure 6C:
FIG. 6C depicts the video feed of FIG. 6B at a later point in time when the user has pinned the new content item in the video feed.

FIG. 6C depicts the video feed of FIG. 6B at a later point in time. Here, the presenter has pinned the new content item in the video feed.

Figure 6D:
FIG. 6D depicts the video feed of FIG. 6C at a later point in time when, because the new content item is partially transparent, the presenter is able to point to different parts of the content item without entering into the pointer mode shown in FIG. 5D.

FIG. 6D depicts the video feed of FIG. 6C at a later point in time. Here, because the new content item is partially transparent, the presenter is able to point to different parts of the content item without entering into the pointer mode discussed above with respect to FIG. 5D.

Figure 7A:
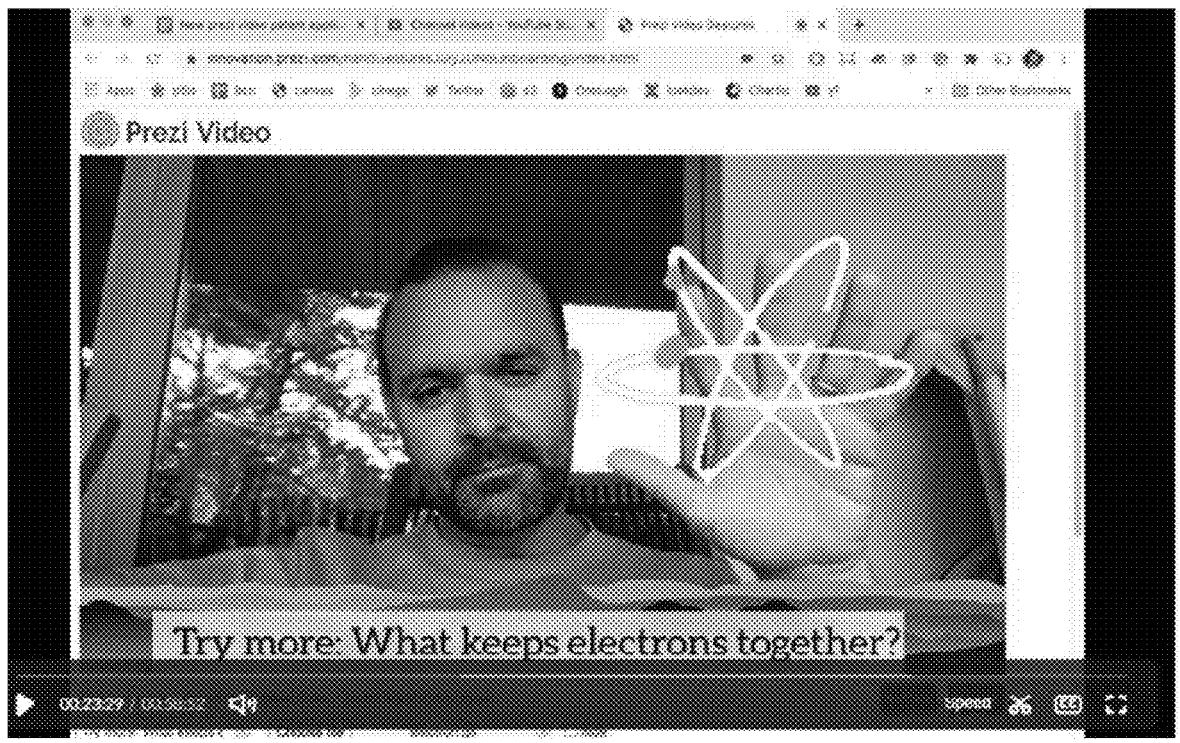
FIG. 7A depicts a video feed of a user in which a new presentation is being made.

FIG. 7A depicts a video feed of a presenter in which a new presentation is being made. Here, the topic is "What keeps electrons together?"). As shown, a first content item depicting electrons has been inserted into the video feed and pinned at its currently location.

Figure 7B:
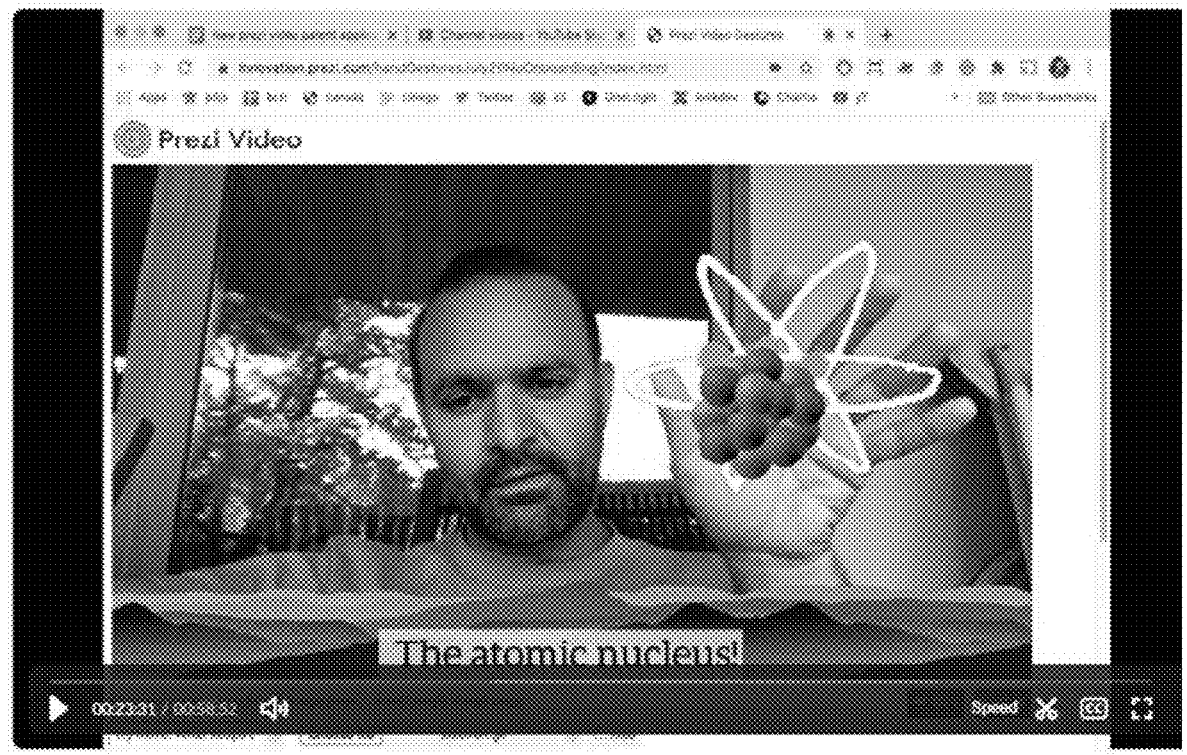
FIG. 7B depicts the video feed of FIG. 7A at a later point time when a second content item has been inserted into the presentation (e.g., based on a gesture having been made by the user).

FIG. 7B depicts the video feed of FIG. 7A at a later point time. Here, a second content item depicting the atomic nucleus has been inserted into the presentation (e.g., based on a gesture having been made by the presenter).

Figure 7C:
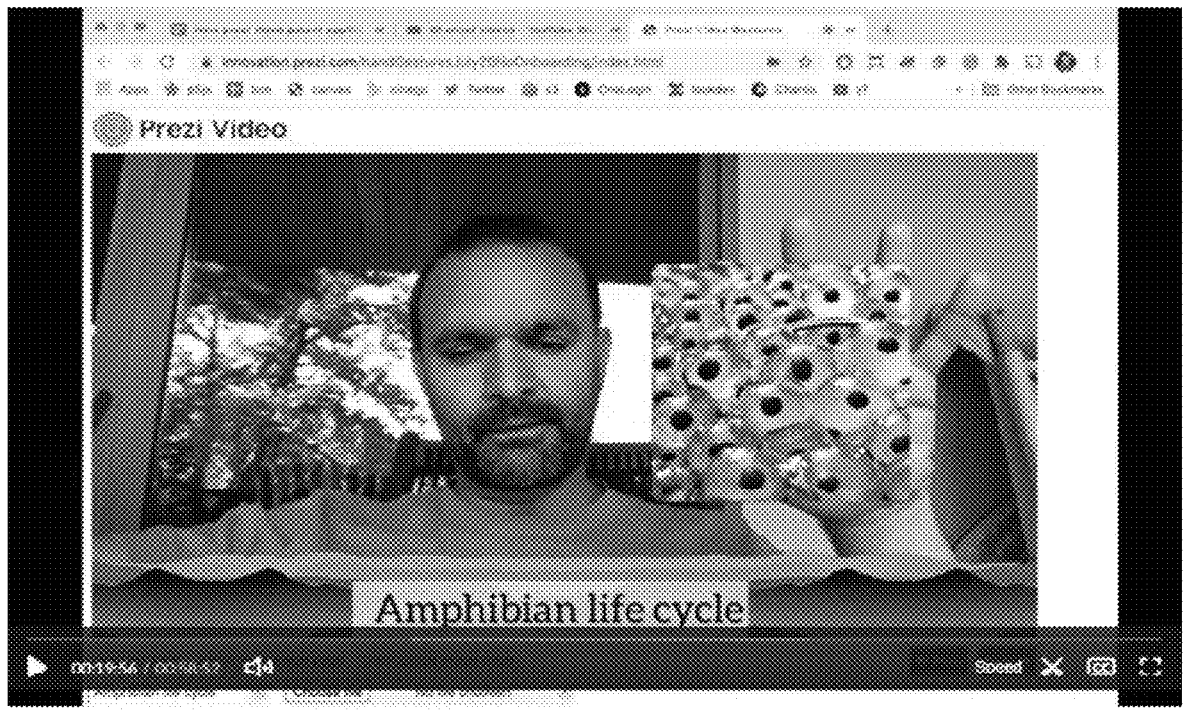
FIG. 7C depicts the video feed of 7B at a later point in time when the presenter has used a gesture to cause a first content item for this topic to appear in the video feed.

FIG. 7C depicts the video feed of 7B at a later point in time. Here, the topic of the presentation is "Aniphibian life cycle." The presenter has used a gesture to cause a first content item for this topic to appear in the video feed—frog eggs.

Figure 7D:
FIG. 7D depicts the video feed of FIG. 7C at a later point in time when the user has used a gesture to cause a second content item for the current topic to appear in the video feed.

FIG. 7D depicts the video feed of FIG. 7C at a later point in time. Here, the presenter has used a gesture to cause a second content item for the current topic to appear in the video feed frog embryos.

Figure 7E:
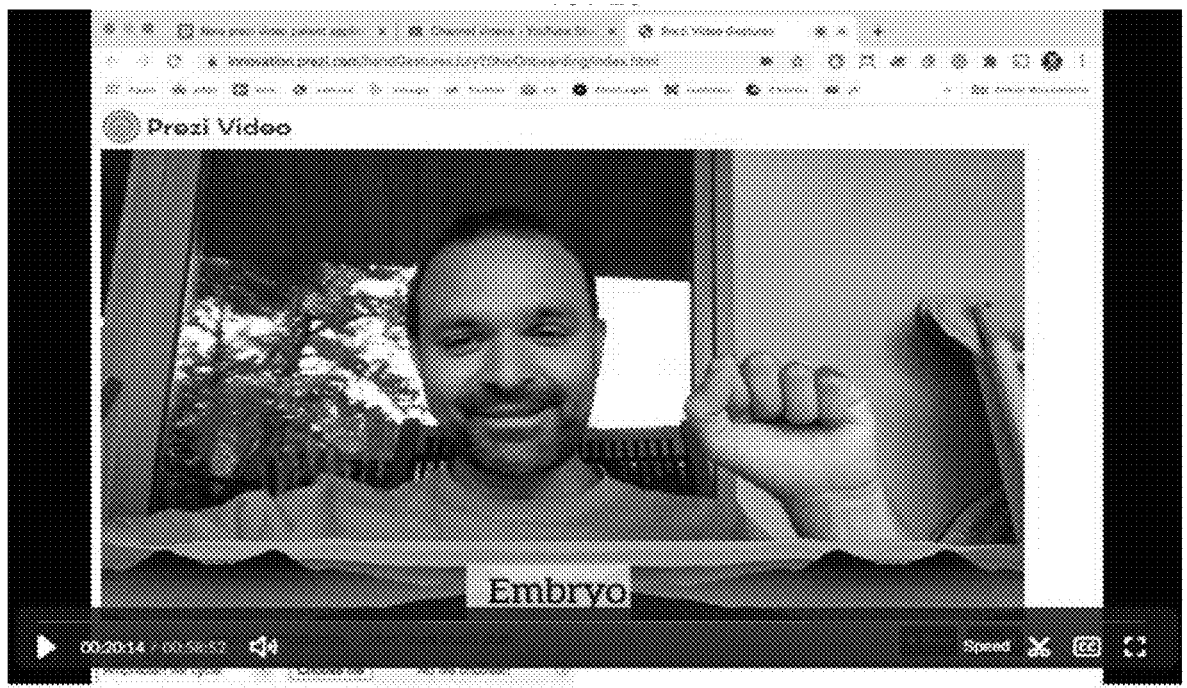
FIG. 7E depicts the video feed of FIG. 7D at a later point in time when the user has caused the previous content item to disappear.

FIG. 7E depicts the video feed of FIG. 7d at a later point in time. Here, the presenter has caused the previous content item to disappear (e.g., by using an appropriate gesture, such as a closed fist). Here, the presenter can build suspense, asking his audience "What's next?"

Figure 7F:
FIG. 7F depicts the video feed of FIG. 7E at a later point in time when the user has caused a new content item to appear.

FIG. 7F depicts the video feed of FIG. 7E at a later point in time. Here, the presenter completed a gesture to cause a new content item to appear by opening his hand. This is the moment before the new content item appears.

Figure 7G:
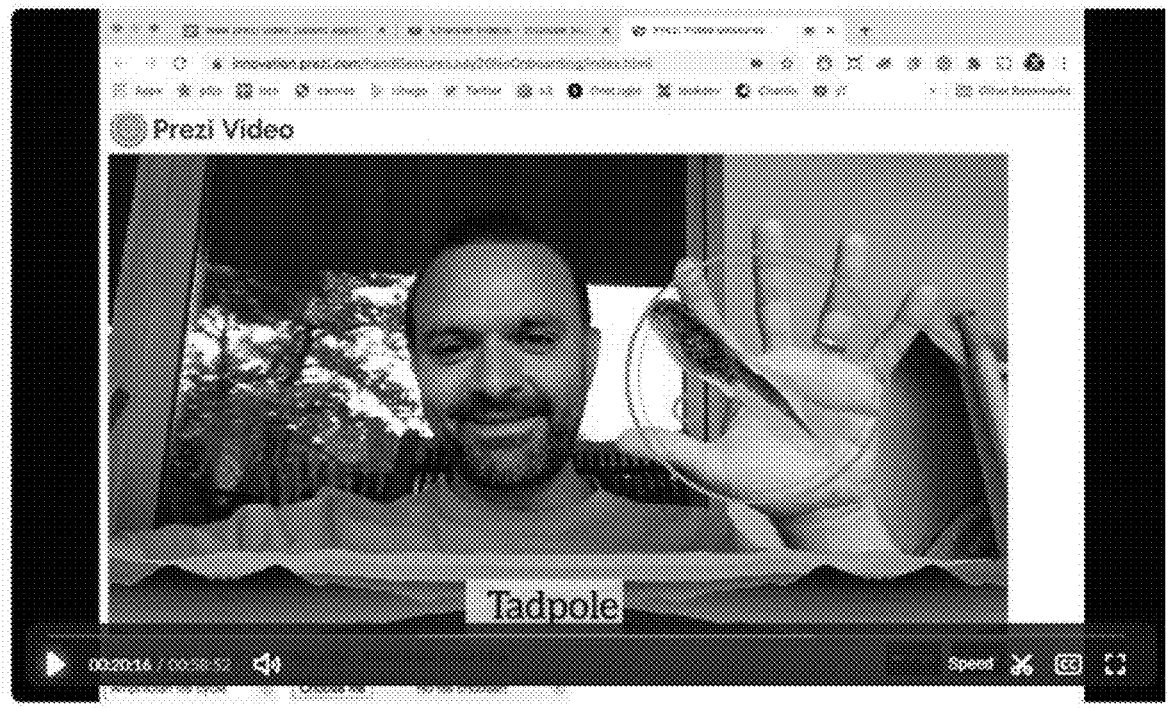
FIG. 7G depicts the video feed of FIG. 7F at a later point in time when a new content item has been inserted in the video feed at the location of the user's hand.

FIG. 7G depicts the video feed of FIG. 7F at a later point in time. Here, a tadpole has been inserted in the video feed at the location of the presenter's hand. In example embodiments, the tadpole has been scaled to fit the presenter's hand.

Figure 7H:
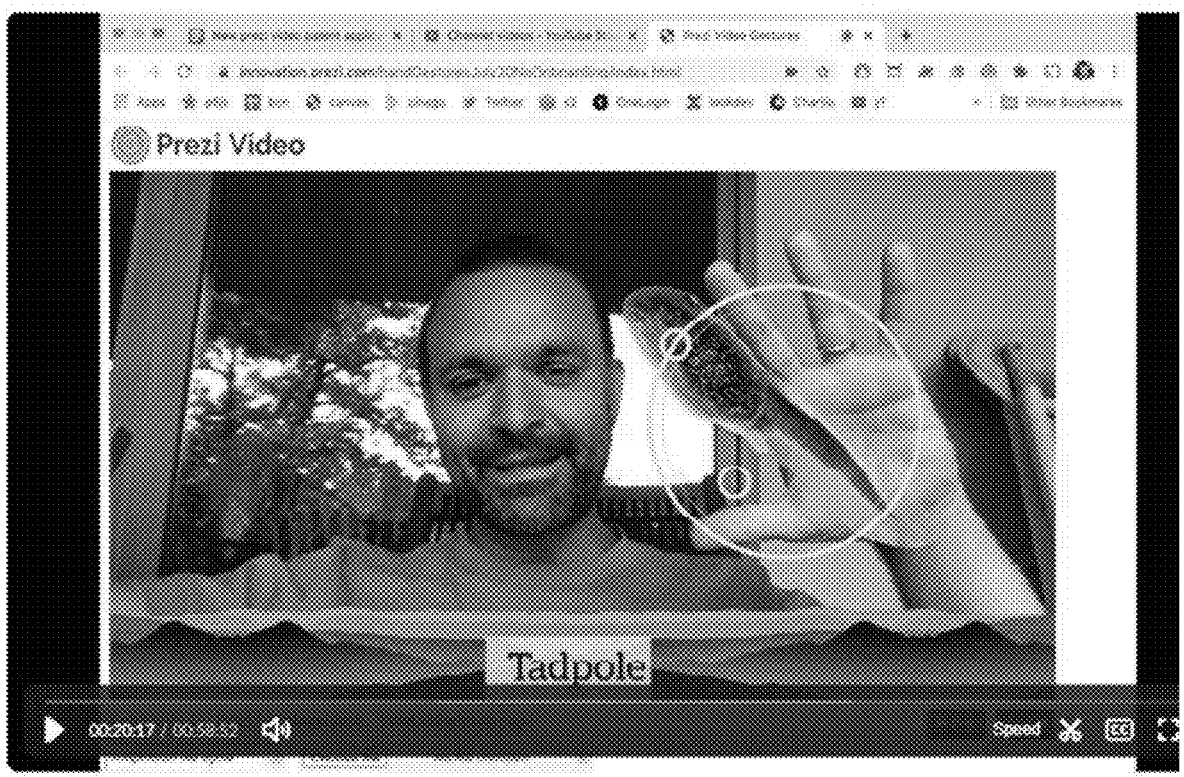
FIG. 7H depicts the video feed of FIG. 7G at a later point when the user has entered into a content manipulation mode with respect to the content item and then repositioned and resized the content item.

FIG. 7H depicts the video feed of FIG. 7G at a later point in time. Here, the presenter has entered into a content manipulation mode with respect to the tadpole content item and then repositioned and resized the tadpole.

Figure 8A:
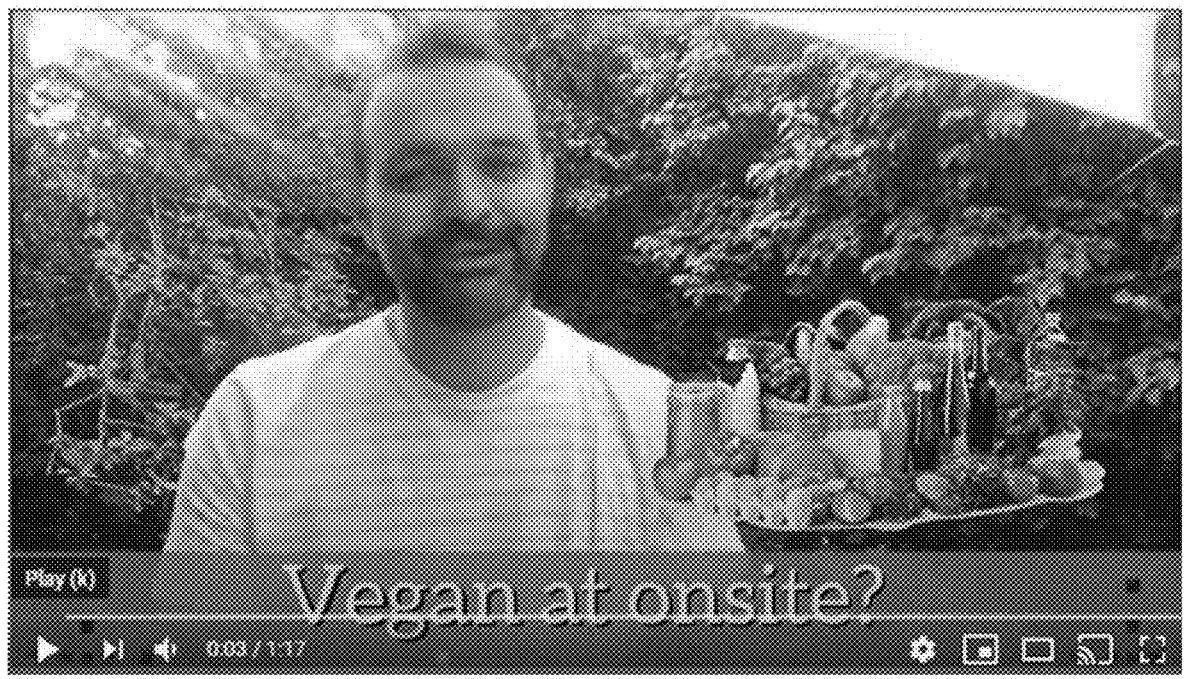
FIG. 8A depicts a video feed in which a user has initiated a survey during a communication session (e.g., a video conference).

FIG. 8A depicts a video feed in which the presenter has initiated a survey. The survey question pertains to whether there should be vegan food options offered to employees at a company's next onsite meeting. In example embodiments, the survey may be initiated by the presenter causing the content item of the food to appear in the video feed.

Figure 8B:
FIG. 8B depicts a video feed of another client device in which it is detected that one of the participants has made a predetermined gesture indicating a positive response to the survey question.

FIG. 8B depicts a video feed of another client device in which it is detected that one of the participants in the communication session raised his left hand in an open position, which is a predetermined gesture indicating a positive response to the survey question. A content item (e.g., a check mark) is inserted into the video feed of the respondent that is indicative of the respondent's answer.

Figure 8C:
FIG. 8C depicts a video feed of another client device in which it is detected that another one of the participants made the same predetermined gesture, indicating another positive answer to the survey question.

FIG. 8C depicts a video feed of another client device in which it is detected that another one of the participants raised her left hand, indicating another positive answer to the survey question.

Figure 8D:
FIG. 8D depicts a video feed of another client device in which it is detected that one of the participants made a different gesture, indicating a negative answer to the survey question.

FIG. 8D depicts a video feed of another client device in which it is detected that one of the participants raised his right hand, indicating a negative answer to the survey question. In this case, a different visual representation (e.g., an "X") is shown in the hand of the respondent.

Figure 8E:
FIG. 8E depicts an updated video feed of the initiator of the survey in which an additional content item has been inserted into the video feed that indicates the result of the survey.

FIG. 8E depicts an updated video teed of the presenter. Here, an additional content item has been inserted into the video feed that indicates the result of the survey. In example embodiments, the content item is updated in real-time as the answers to the survey questions are detected in the other video feeds of the communication session.

Figure 9A:
FIG. 9A depicts a video feed in which the user has initiated another survey.

FIG. 9A depicts a video feed in which the presenter has initiated another survey (e.g., by advancing to the next phase of a presentation associated with the video feed). The survey question pertains to whether the participants in the communication session would like to go on a Whitewater rafting trip.

Figure 9B:
FIG. 9B depicts a video teed of a client device in which it is detected that one of the participants raised made a predetermined gesture a positive answer to the survey question.

FIG. 9B depicts a video feed of a client device in which it is detected that one of the participants raised his left hand, indicating another positive answer to the survey question.

Figure 9C:
FIG. 9C depicts a video feed of another client device in which it is detected that one of the participants made a different predetermined gesture indicating a negative answer to the survey question.

FIG. 9C depicts a video feed of another client device in which it is detected that one of the participants raised his right hand, indicating a negative answer to the survey question.

Figure 9D:
FIG. 9D depicts an updated video feed of the presenter in which an additional content item has been inserted into the video feed that indicates the result of the survey. In example embodiments, the content item is updated in real-time as the answers to the survey questions are detected in the other video feeds of the communication session.

FIG. 9D depicts an updated video feed of the presenter. Here, an additional content item has been inserted into the video feed that indicates the result of the survey. In example embodiments, the content item is updated in real-time as the answers to the survey questions are detected in the other video feeds of the communication session.

When these effects are considered in aggregate, one or more of the methodologies described herein may obviate a need for certain efforts or resources that otherwise would be involved in providing improved user experiences with presentation of multiple streams of video content in a user interface on a device. Efforts expended by a user in perceiving or otherwise obtaining such improved user experiences, or by an administrator in hosting or otherwise providing such improved user experiences, may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 10:
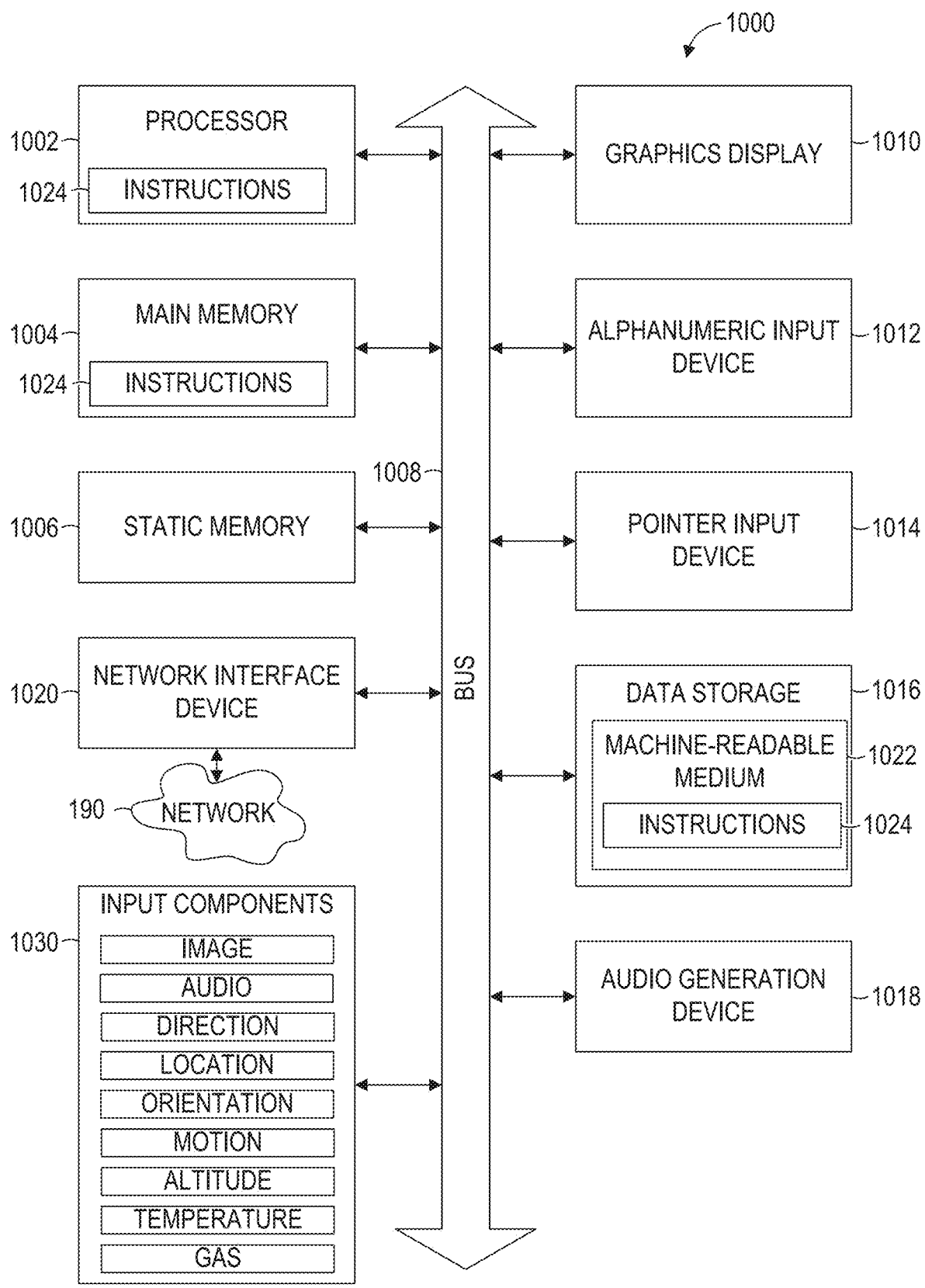
FIG. 10 is a block diagram illustrating components of a machine, according to some example embodiments, able to read instructions from a machine-readable medium and perform any one or more of the operations or methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer, which may be a supercomputer) within which the instructions 1024 (e.g., software, a program, an application, an applet, an app, or other executable code) for causing the machine 1200 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer (e.g., a supercomputing server), a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., one or more central processing units (CPUs), one or more graphics processing units ((CPUs), one or more quantum processing units, one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or any suitable combination thereof, before or during execution thereof by the machine 1000. Accordingly, the main memory 1004, the static memory 1006, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device (e.g., a smart phone, a tablet computer, or a wearable device), and may have one or more additional input components 1030 (e.g., sensors or gauges). Examples of such input components 1030 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1030 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1024 for execution by the machine 1000 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1024).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces e.g., an application program interface (API). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
one or more computer processors;
one or more computer memories;
a set of instructions incorporated into the one or more computer memories, the set of instructions configuring the one or more computer processors to perform operations, the operations comprising:
receiving a live video feed captured by a video capturing device;
enhancing a presentation of the live video feed on one or more client devices, the enhancing including causing a first content item of a plurality of content items to be displayed at a first location within the presentation of the live video feed;

based on a detecting of a first instance of a first gesture made by a hand at the first location in the live video feed, entering a content item manipulation mode with respect to the first content item, the entering of the content item manipulation mode with respect to the first content item including at least one of causing the first content item to be moved within the presentation of the live video feed based on a movement of the hand or causing a scale of the first content item to be changed within the presentation of the live video feed based on a detecting of a second gesture made by the hand;

based on a detecting of a third gesture made by the hand, pinning the first content item within the presentation of the live video feed, the pinning including ending the content item manipulation mode such that a detecting of a subsequent gesture made by the hand does not affect the display of the first content item within the presentation of the live video feed; and entering a pointer mode, the entering of the pointer mode including causing the first content item to be moved to a foreground within the presentation such that one or more parts of the hand that overlap with the first content item are hidden behind the first content item and replaced with an at least partially transparent representation such that pointing by the one or more parts does not obscure the first content item.

2. The system of claim 1, wherein the causing of the first content item to be displayed at the first location is based on a detecting of a fourth gesture made by the hand at the first location, the detecting of the fourth gesture including detecting that the hand has moved from a close-fisted state to an open-handed state.

3. The system of claim 1, the operations further comprising, based on a detecting of a fourth gesture made by the hand, causing the first content item to be removed from the presentation of the live video feed, the detecting of the fourth gesture including detecting that the hand has moved from an open-handed state to an at least partially-closed state.

4. The system of claim 3, wherein the entering of the content item manipulation mode is further based on the detecting of the first instance of the first gesture being held for a first predetermined period of time and wherein the causing of the first content item to be removed from the presentation of the live video feed is further based on the detecting of the fourth gesture being held for a second predetermined period of time, the second predetermined period of time being longer than the first predetermined period of time.

5. The system of claim 3, the operations further comprising, based on the detecting of the fourth gesture, causing a second content item from the plurality of content items to be displayed within the live video feed, the second content item being a next content item in a sequence associated with the plurality of content items.

6. The system of claim 1, the operations further comprising, based on an additional detecting of the third gesture made by the hand, unpinning the first content item within the presentation the live video feed.

7. The system of claim 1, the operations further comprising further enhancing the presentation of the live video feed by causing a second content item of the plurality of content items to be displayed at a second location within the presentation of the live video feed simultaneously with the pinned first content item.

8. The system of claim 7, wherein the causing of the second content item of the plurality of content items to be displayed within the live video feed is based on a detecting of an advancement of a presentation associated with the plurality of content items, the advancement causing a selecting of the second content item from the plurality of content items.

9. The system of claim 1, the operations further comprising entering a pointer mode, the entering of the pointer mode including causing the first content item to be moved to a foreground within the presentation such that one or more parts of the hand that overlap with the first content item are hidden behind the first content item and replaced with an at least partially transparent representation such that pointing by the one or more parts does not obscure the first content item.

10. The system of claim 1, wherein the first gesture is an open-hand gesture and the detecting of the first gesture includes measuring a ratio of a vertical distance between a palm of the hand and a middle finger of the hand and measuring a distance between a pinky of the hand and a thumb of the hand in real time during the presentation of the live video feed.

11. The system of claim 10, wherein the first content item is a compound content item having individually selectable content items and the operations further comprise, based on a detecting of a second instance of the first gesture at a location of one of the individually selectable content items, entering into the content item manipulation mode with respect to the one of the individually selectable content items.

12. The system of claim 1, wherein the first content item is a three-dimensional content item and the entering of the content item manipulation mode with respect to the first content item alternatively includes rotating the first content item in three dimensions during the presentation of the live video feed based on a detecting in real-time of a fourth gesture made by the hand.

13. The system of claim 1, wherein the second gesture includes closing the hand into a first and extending one or more of a thumb and a forefinger.

14. The system of claim 1, the operations further comprising, based on an initiation of a survey question at a client device associated with the live video feed, aggregating a plurality of answers to the survey question, the aggregating including, based on a fourth gesture being detected in real time in one of one or more other live video feeds captured via one or more other video capture devices, increasing a count of a first possible answer the survey question or, based on a fifth gesture being detected in real time in the one of one or more other live video feeds captured via one or more other video capture devices, increasing a count of a second possible answer the survey question.

15. The system of claim 14, wherein the enhancing further includes causing updating of a second content item of the plurality of content items in real time at a second location within the presentation of the live video feed, the second content item including a visual representation of the aggregating of the plurality of answers during a collecting of the plurality of answers.

16. The system of claim 14, the operations further comprising enhancing the one of the one or more other live video feeds, the enhancing of the one of the one or more other live video feeds including causing a visual representation of the first possible answer or the second possible answer to be displayed within a presentation of the one of the one or more other live video feeds.

17. The system of claim 14, wherein the first content item is associated with the survey question and the initiation of the survey question is based on a causing of the first content item to be displayed at the first location.

18. The system of claim 14, wherein the detecting of the fourth gesture or the detecting of the fifth gesture is based on a detecting that the third gesture or the fourth gesture has been held for a predetermined amount of time.

19. A method comprising:
receiving a live video feed captured by a video capturing device;
enhancing a presentation of the live video feed on one or more client devices, the enhancing including causing a first content item of a plurality of content items to be displayed at a first location within the presentation of the live video feed;
based on a detecting of a first instance of a first gesture made by a hand at the first location in the live video feed, entering a content item manipulation mode with respect to the first content item, the entering of the content item manipulation mode with respect to the first content item including at least one of causing the first content item to be moved within the presentation of the live video feed based on a movement of the hand or causing a scale of the first content item to be changed within the presentation of the live video feed based on a detecting of a second gesture made by the hand;
based on a detecting of a third gesture made by the hand, pinning the first content item within the presentation of the live video feed, the pinning including ending the content item manipulation mode such that a detecting of a subsequent gesture made by the hand does not affect the display of the first content item within the presentation of the live video feed; and
entering a pointer mode, the entering of the pointer mode including causing the first content item to be moved to a foreground within the presentation such that one or more parts of the hand that overlap with the first content item are hidden behind the first content item and replaced with an at least partially transparent representation such that pointing by the one or more parts does not obscure the first content item.

20. A non-transitory computer-readable storage medium including a set of instructions that, when executed by one or more computer processors, causes the one or more computer processors to perform operations, the operations comprising:
receiving a live video feed captured by a video capturing device;
enhancing a presentation of the live video feed on one or more client devices, the enhancing including causing a first content item of a plurality of content items to be displayed at a first location within the presentation of the live video feed;
based on a detecting of a first instance of a first gesture made by a hand at the first location in the live video feed, entering a content item manipulation mode with respect to the first content item, the entering of the content item manipulation mode with respect to the first content item including at least one of causing the first content item to be moved within the presentation of the live video feed based on a movement of the hand or causing a scale of the first content item to be changed within the presentation of the live video feed based on a detecting of a second gesture made by the hand;
based on a detecting of a third gesture made by the hand, pinning the first content item within the presentation of the live video feed, the pinning including ending the content item manipulation mode such that a detecting of a subsequent gesture made by the hand does not affect the display of the first content item within the presentation of the live video feed; and
entering a pointer mode, the entering of the pointer mode including causing the first content item to be moved to a foreground within the presentation such that one or more parts of the hand that overlap with the first content item are hidden behind the first content item and replaced with an at least partially transparent representation such that pointing by the one or more parts does not obscure the first content item.

* * * * *